United States Patent
Blum

(10) Patent No.: US 7,075,270 B1
(45) Date of Patent: Jul. 11, 2006

(54) CHARGER CONTACT

(75) Inventor: James E. Blum, San Jose, CA (US)

(73) Assignee: Plantronics, Inc., Santa Cruz, CA (US)

( * ) Notice: Subject to any disclaimer, the term of this patent is extended or adjusted under 35 U.S.C. 154(b) by 306 days.

(21) Appl. No.: 10/622,037

(22) Filed: Jul. 16, 2003

(51) Int. Cl.
*H01M 10/46* (2006.01)

(52) U.S. Cl. .................................... 320/114

(58) Field of Classification Search ............... 320/107, 320/112, 113, 114, 115; 439/700, 824
See application file for complete search history.

(56) References Cited

U.S. PATENT DOCUMENTS

| | | | | |
|---|---|---|---|---|
| 4,272,662 A | * | 6/1981 | Simpson | 200/275 |
| 4,588,938 A | * | 5/1986 | Liautaud et al. | 320/115 |
| 5,173,679 A | * | 12/1992 | Mount | 200/83 S |
| 5,457,609 A | | 10/1995 | Bhanot et al. | |
| 5,664,973 A | | 9/1997 | Emmert et al. | |
| 6,049,192 A | | 4/2000 | Kfoury et al. | |
| 6,049,725 A | | 4/2000 | Emmert et al. | |
| 6,398,592 B1 | * | 6/2002 | Mori et al. | 439/700 |
| 6,878,016 B1 | * | 4/2005 | Wulff et al. | 439/700 |

* cited by examiner

*Primary Examiner*—Edward H. Tso
(74) *Attorney, Agent, or Firm*—Thomas Chuang

(57) ABSTRACT

The present invention provides a solution to the needs described above through an inventive charger contact. The conductive contact includes a housing with an outer cylindrical surface and a hollow inner cylindrical core with a longitudinal axis. An actuator is disposed within the hollow inner cylindrical core capable of movement within the cylindrical core along the axis. A spring contact with conductive contacts is disposed in part within the hollow inner cylindrical core and coupled to the actuator. The spring contact is capable of compression and decompression along the longitudinal axis based on movement of the actuator.

21 Claims, 12 Drawing Sheets

CHARGER CONTACT

TECHNICAL FIELD

The present invention relates to the general field of charging interfaces. More specifically the invention relates to charger contacts.

BACKGROUND

Wireless headsets and other portable communications devices are often battery powered such that a user can use the wireless headset or other such device without being directly connected to larger power source such as an a/c outlet or automobile battery. This allows wireless headset users flexibility and convenience to move about without being tied to a power cord. Wireless headset batteries are generally rechargeable so that the batteries can be recharged and need not be discarded after use.

In the prior art, devices employing rechargeable batteries typically have charging contacts so that charging current power can be supplied to recharge the batteries without removing the batteries from the device. In one typical setup, the portable device is inserted into a base charger which has spring loaded contacts that correspond to and couple with the contacts on the portable device. For example, such a setup is used with remote handset phones used in the home. The base charger is connected to a power source, and supplies charging current through the coupled contacts to recharge the batteries located within the device.

Spring-loaded wiping (surface) contacts are generally used with charging bases. This is a convenience feature as users can simply drop the portable device into a cradle without fumbling with a plug. Although there are plug-type docking connectors, such as those used by personal digital assistants (PDAs), there are several reasons why a plug connector is not a good solution when docking a headset to a base. The first is pull-out force. Plugs usually require too much force to connect and disconnect, requiring two hands to undock the headset, offsetting the main reason for the base in the first place: convenience. The second is that a plug connector does not lend itself to docking because of the wide variety of unknown future form factors.

Surface contacts can be placed on the side of a taper form headset or other portable rechargeable device, making docking into a cradle much easier than a plug. However, use of surface contacts and a charging base station with a headset rather than a plug present additional problems due to the smaller physical size and design of headsets. During the rechargeable device docking process, the formed ends of the base station charging contacts often come into contact with the plastic housing of the rechargeable device and can scratch the housing and pick up contamination which can cause intermittent electrical contact. One potential solution is to cut the rechargeable device housing away to fully expose the rechargeable device stationary contacts so that the spring loaded contacts of the base station never touched the plastic housing during docking. However, this solution may compromise the rechargeable device industrial design, aesthetics, and possibly weaken the rechargeable device structural integrity.

Furthermore, the headset or other rechargeable device may not be firmly detented with the charging base, which may also cause intermittent electrical contact. One potential solution to the weak coupling between the portable rechargeable device and charging base to dish the stationary contacts in the rechargeable device so that the rechargeable device detents when the ends of the spring loaded base station contacts press into the depressions in the rechargeable device contacts. However, this solution compromises the industrial design of the rechargeable device, and in addition the detent force is less than robust. Thus, improved charging interfaces between charging base stations and rechargeable devices are needed.

SUMMARY OF THE INVENTION

The present invention provides a solution to the needs described above through an inventive charger contact.

The present invention provides an apparatus for a conductive contact. The conductive contact includes a housing with an outer cylindrical surface and a hollow inner cylindrical core with a longitudinal axis. An actuator is disposed within the hollow inner cylindrical core capable of movement within the cylindrical core along the axis. A spring contact with a conductive contact is disposed in part within the hollow inner cylindrical core and coupled to the actuator. The spring contact is capable of compression and decompression along the longitudinal axis based on movement of the actuator.

The present invention further provides a headset charging base. The charging base includes a body with a cradle having a cradle well for receiving a headset. A charging base conductive contact apparatus is coupled to the body. The charging base conductive contact apparatus includes a hollow inner cylindrical core with a longitudinal axis, an actuator disposed within the hollow inner cylindrical core capable of movement within the cylindrical core along the axis, and a spring contact with conductive contacts disposed in part within the hollow inner cylindrical core and coupled to the actuator. The spring contact is capable of compression and decompression along the longitudinal axis based on movement of the actuator. The headset is properly guided by the cradle when the headset is inserted into the cradle such that conductive contacts disposed on the headset are aligned with the spring contact of the charging base conductive contact apparatus.

The invention further provides a method for coupling base station charging contacts located at a headset charging base to headset charging contacts disposed on a headset body. The method includes providing an actuator at the base station charging contact and contacting the headset body with the actuator during coupling. The actuator lifts the base station charging contacts in a direction away from the headset body during coupling such that friction between the base charging contacts and the headset body is reduced. The method further includes releasing the base station charging contacts in a direction towards the headset body to mate the base station charging contacts with the headset charging contacts when the headset charging contacts are properly positioned.

The invention further provides a charging interface system between a charging base and a wireless headset. The charging interface system includes a wireless headset charging interface disposed at a headset and a charging base interface disposed at a charging base. The wireless headset charging interface includes a housing with a front surface. The front surface includes a recessed area, and conductive contacts are disposed on the front surface outside the recessed area. The conductive contacts include a positive contact and a negative contact. The charging base includes a hollow inner core with a longitudinal axis, an actuator disposed within the hollow inner core capable of movement within the cylindrical core along the axis, and a spring contact with a conductive contact disposed in part within the hollow inner core and coupled to the actuator. The spring contact is capable of compression and decompression along the longitudinal axis responsive to movement of the actuator. The actuator extends into the recessed area when the charging base interface is coupled to the wireless headset charging interface.

DESCRIPTION OF THE DRAWINGS

The features and advantages of the apparatus and method of the present invention will be apparent from the following description in which.

DETAILED DESCRIPTION OF THE PREFERRED EMBODIMENTS

The present invention provides a solution to the needs described above through an inventive charger contact.

Other embodiments of the present invention will become apparent to those skilled in the art from the following detailed description, wherein is shown and described only the embodiments of the invention by way of illustration of the best modes contemplated for carrying out the invention. As will be realized, the invention is capable of modification in various obvious aspects, all without departing from the spirit and scope of the present invention. Accordingly, the drawings and detailed description are to be regarded as illustrative in nature and not restrictive.

The present disclosure describes a charging contact apparatus for a headset base and an associated headset base for receiving a headset that is easily inserted and removed from the charging base. The present invention enables the coupling of charging contacts of the headset with associated corresponding charging contacts of the headset base without contact between the charging contacts of the headset base with the headset housing (i.e. the non-charging contact portions of the headset), which is typically constructed of plastic. The charging contact apparatus further enables simultaneously a means for detenting the headset with the base station.

In particular, the charging contact apparatus for the headset base retracts the headset base charging contacts utilizing an actuator during coupling of the headset to the headset base. When the actuator moves into a detent position with the headset, the base charging contacts are extended to engage the headset charging contacts. The coupling of the base charging contact actuator with the base charging contact and association spring enables the retraction and extension of the base charging contacts. When extended, the base charging contacts form a secure electrical connection with the headset contacts to provide charging power to the headset battery.

Figure 6:
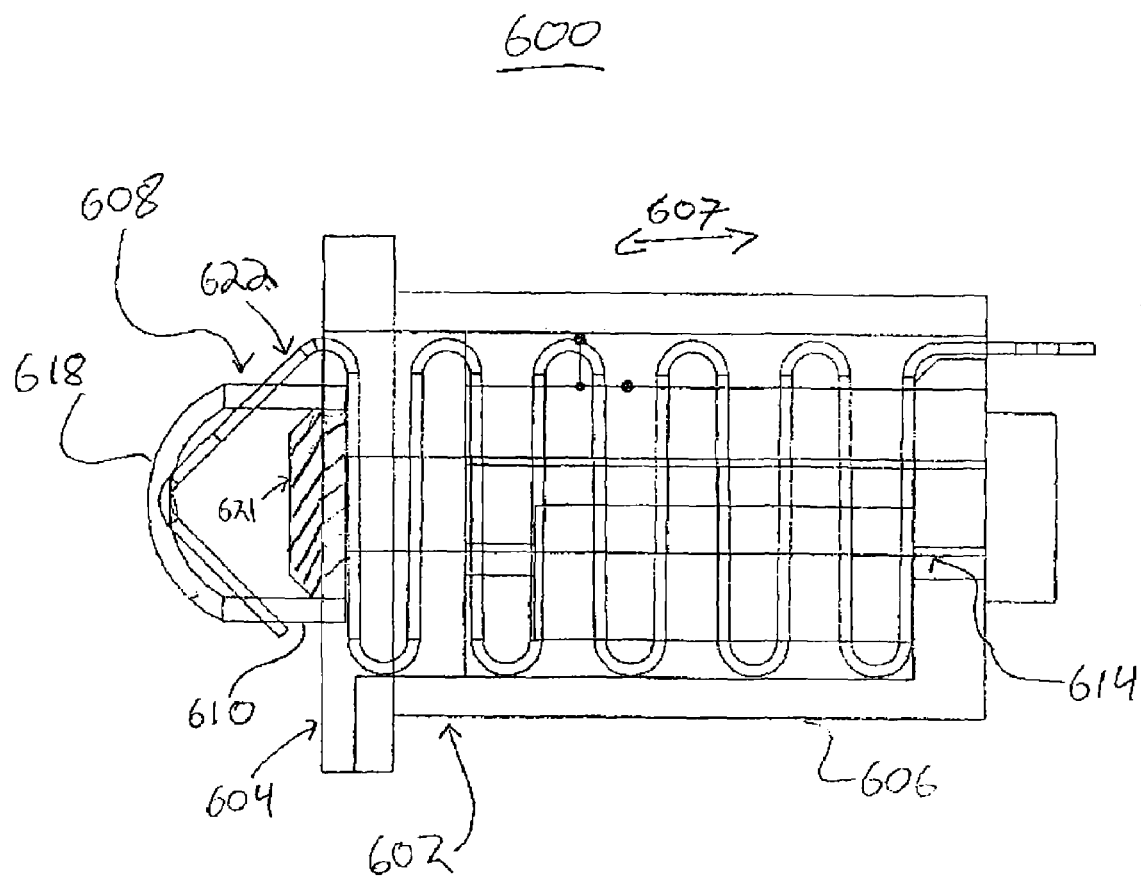
FIG. 6 is a side view diagram illustration of an embodiment of the charging contact for use with a charger.

Referring to FIG. 6, a side view diagram illustration of an embodiment of the charging contact apparatus for use with a headset base is shown. The charging contact apparatus is shown in an extended (as opposed to retracted, or compressed) position. The charging contact apparatus in a retracted or compressed position will be illustrated and described below. The base charging contact apparatus 600 comprises an outer housing 602 having a front portion 604 and back portion 606. The back portion 606 of the housing includes a hollow cylindrical core with a longitudinal axis 607. The hollow cylindrical core extends from the base of the back portion 606 through the front portion 604. The base charging contact apparatus further includes an actuator 608 and spring contact 622 and spring contact 624.

Figure 6A:
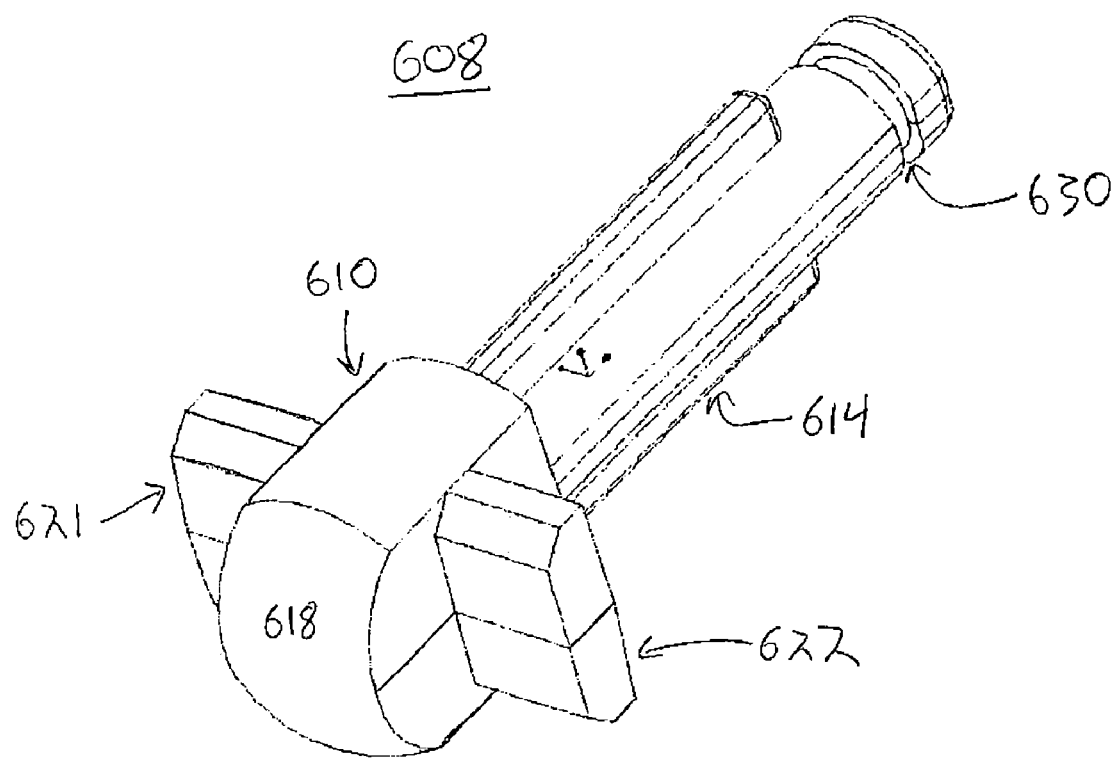
FIG. 6A is a perspective view of the actuator of the charging contact.

Actuator 608 is a dielectric material, such as a molded polymer, disposed within the hollow cylindrical core of outer housing 606 capable of bi-directional movement within the cylindrical core along the longitudinal axis 607. Referring to FIG. 6A, in an embodiment of the invention, actuator 608 includes an outer member 610, inner core member 614, and a slot 630 for a retaining ring 616. Outer member 610 includes an exterior top surface 618, side wing 621, and side wing 622, and is finger shaped with a semi-spherical tip. Spring contact 622 and spring contact 624 are disposed within the hollow cylindrical core and capable of compression (also referred to as "retraction" herein to describe a direction inward into the hollow cylindrical core) and decompression within the cylindrical core along longitudinal axis 607.

Spring contact 622 and spring contact 624 are two independent springs that move in parallel, a positive contact and a negative contact. Referring to FIG. 6, only one spring contact is illustrated for clarity. Spring contact 622 and spring contact 624 are coupled to actuator 608, and compresses or decompresses along longitudinal axis 607 based on movement of actuator 608. In an embodiment of the invention, side wing 621 and side wing 622 of outer member 610 engage spring contact 622 and 624.

One of ordinary skill in the art will recognize that other architectures for coupling actuator 608 with spring contact 622 and 624 may be employed. Furthermore, other architectures may be employed for the apparatus by changing the shape of one or more of the various apparatus elements. For example, the specific shape or components of actuator 608 or the cylindrical core may vary. In addition, outer housing 602 may be integrated with the structure of a charging base.

Figure 7:
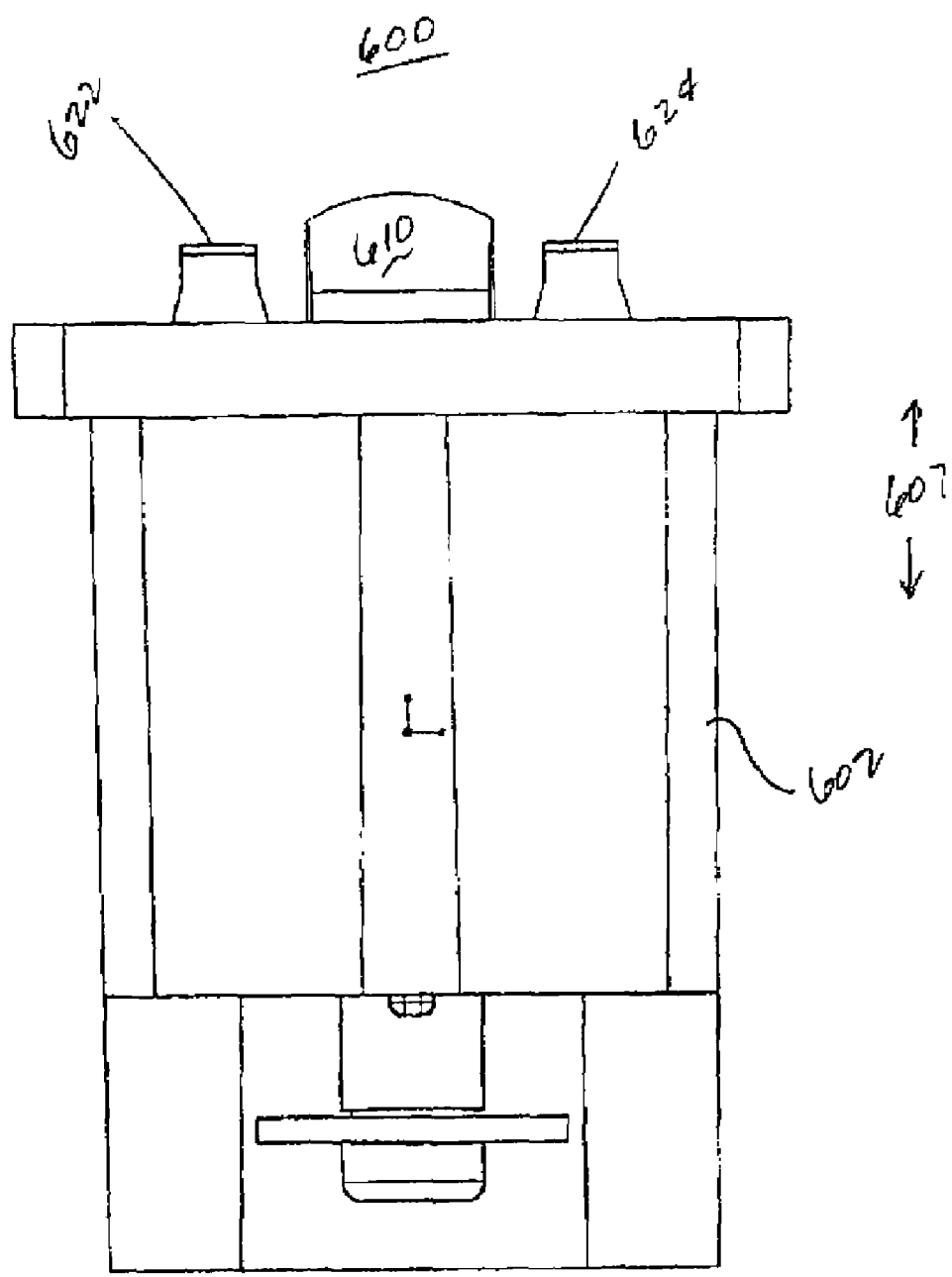
FIG. 7 is a side view of the charging contact.

Referring to FIG. 7, a side view of the actuator outer member 610 and portion of spring contact 622 and 624 extending from housing 602 are shown. Spring contact 622 and 624 couple spring contact 622 and 624 with an associated first and second contact at a headset. Spring contacts 622 and 624 are continuous conductors with formed ends terminating in coupling contacts. Either spring contact 622 or 624 is also coupled to source of power. As illustrated in FIG. 7, actuator outer member 610 extends beyond spring contact 622 and spring contact 624 along longitudinal axis 607. As a result, the actuator outer member 610 will be the first part of the base charging contact apparatus 600 to contact the headset during docking, causing spring contact 622 and spring contact 624 to be lifted clear of the headset housing.

The operation of the base charging contact apparatus 600 will now be described. During coupling of the spring contacts 622 and 624 to an associated set of headset contacts, the actuator 608 moves in an inward retraction direction along the longitudinal axis. Movement of the actuator 608 results in an associated compression of spring contacts 622 and 624 in the same inward retraction direction. In an embodiment of the invention, during docking the actuator outer member 610 contacts the headset, which presses the actuator outer member 610 (and therefore the actuator 608) in the inward retraction direction. Side wings 621 and 622 are coupled to spring contact 622 and 624, and the side wings 621 and 622 compress spring contacts 622 and 624 in the inward retraction direction. The spring contact is thus lifted away from contact with the headset during docking of the headset. When the spring contact 622 and spring contact 624 are correctly aligned with associated contacts on a headset, the actuator outer member 610 extends toward the headset along longitudinal axis 607, allowing the spring contact apparatus to decompress and contact the associated contacts on the headset in a detent position in response to movement of the actuator. The headset conductive contacts are typically stationary on the headset and electrically coupled to a rechargeable battery disposed within the headset. In an embodiment of the invention, the actuator functions as a detent for the conductive contacts.

During decoupling of the base charging contact apparatus 600, the actuator outer member is pressed in the inward retraction direction by the headset. Side wings 621 and 622 once again compress spring contacts 622 and 624 in the inward retraction direction, thereby lifting the spring contacts 622 and 624 from contact with the headset contacts. As removal of the headset from the base charging contact apparatus continues, the spring contacts 622 and 624 are in a retracted position, and are thus lifted away from contact with the headset during decoupling.

Figure 8:
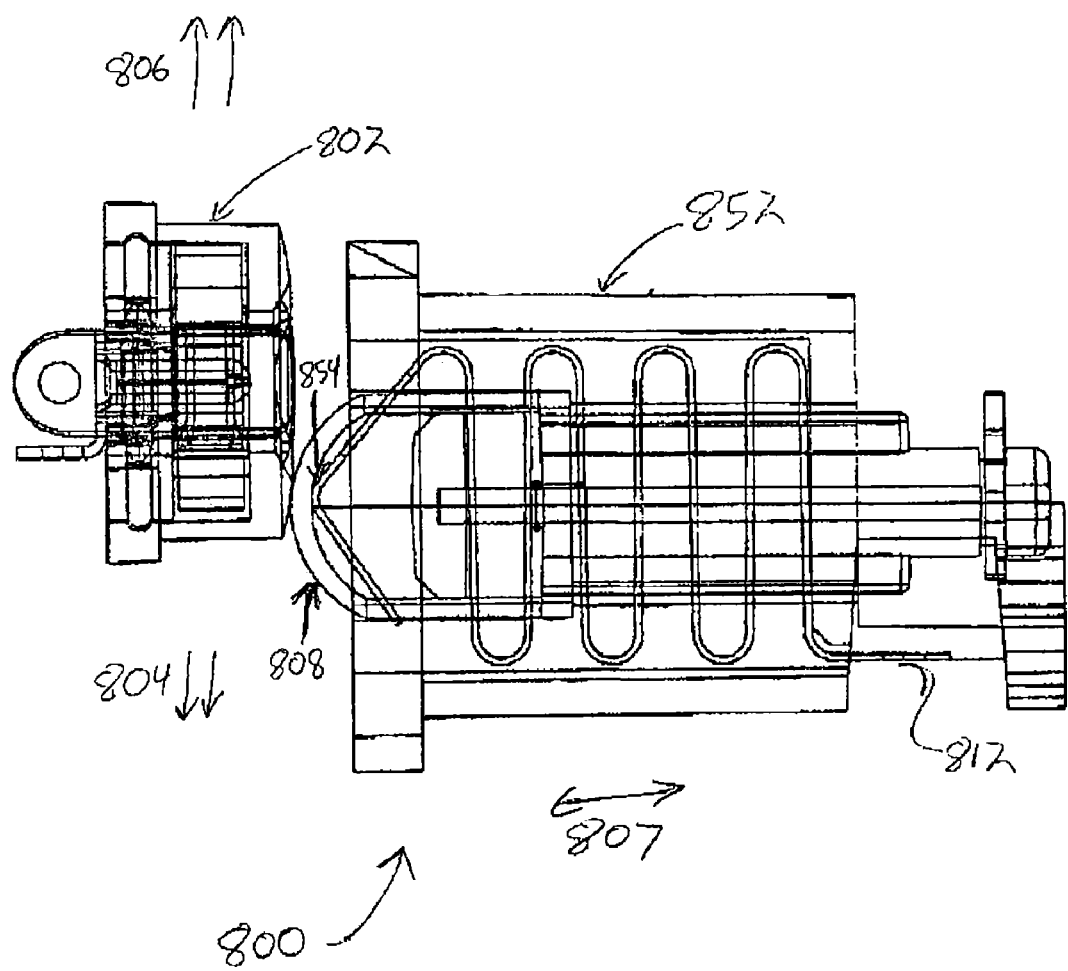
FIG. 8 is a side view illustration of the charging contact during coupling or decoupling with a headset charging contact.

Referring to FIG. 8, a headset contact apparatus 802 that is integrated with a headset is shown being coupled with an embodiment of the base charging contact apparatus 800 of the present invention. Base charging contact apparatus 800 is illustrated in a retracted state, with actuator 808 and spring contact apparatus 812 shown retracted relative to FIG. 6. Spring contact apparatus 812 comprises two independent springs as described above. The base charging contact apparatus 800 enters a retraction process during coupling of the headset contact apparatus 802 prior to detent, and also enters the retraction process during decoupling after removal from detent. During coupling, the headset contact apparatus 802 is moved in a downward coupling direction 804 while in contact with actuator 808 of the base charging contact apparatus 800, resulting in actuator 808 retracting along longitudinal axis 807. Retraction of actuator 808 results in retraction of spring contact apparatus 812 within outer housing 852, thereby lifting away the spring conductive contacts 854 from the headset charging contact 802 and headset during headset docking.

Figure 9:
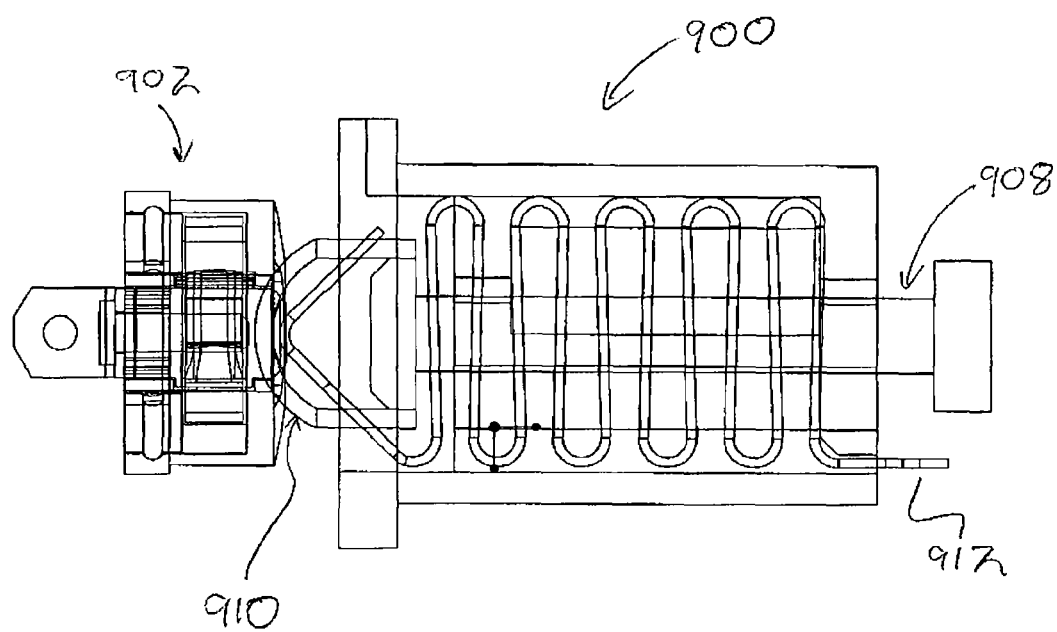
FIG. 9 is a side diagram illustration of the charging contact after coupling with a headset charging contact.

Referring to FIG. 9, a base charging contact apparatus 900 of the present invention is shown in detent with an example headset contact apparatus 902. During a state of detent, the base charging contact apparatus 900 is in an extended state, with actuator 908 and spring contact apparatus 912 returned to their resting extended state following retraction during the coupling process described in reference to FIG. 8. In an embodiment of the invention, actuator outer member 910 extends into a recessed area or well disposed within the headset contact apparatus 902, allowing contacts of the spring contact apparatus 912 to couple in a detent position with associated contacts of the headset contact apparatus. The actuator outer member 910 slips into the recessed area or well disposed within the headset contact apparatus 902 allowing the spring loaded contacts to couple with the corresponding contacts on the headset contact apparatus 902 to complete the charging loop. The pressure of the actuator member against the aperture or recessed area leading to the well provides a means of detenting the headset in place. The pressure is limited by the need for the headset to be easily removed from the charging base.

Referring to FIG. 8, during de-coupling, the headset contact apparatus 802 is moved in an upward de-coupling direction 806 relative to base charging contact 800 from the detent coupled position shown and described in FIG. 9. The upward direction results in actuator 808 retracting along longitudinal axis 807. Retraction of actuator 808 results in retraction of spring contact apparatus 812 within outer housing 852, thereby lifting away the spring conductive contacts 854 from the headset charging contact 802 and headset during de-coupling of the headset from the base charging contact apparatus 800.

Figure 10A:
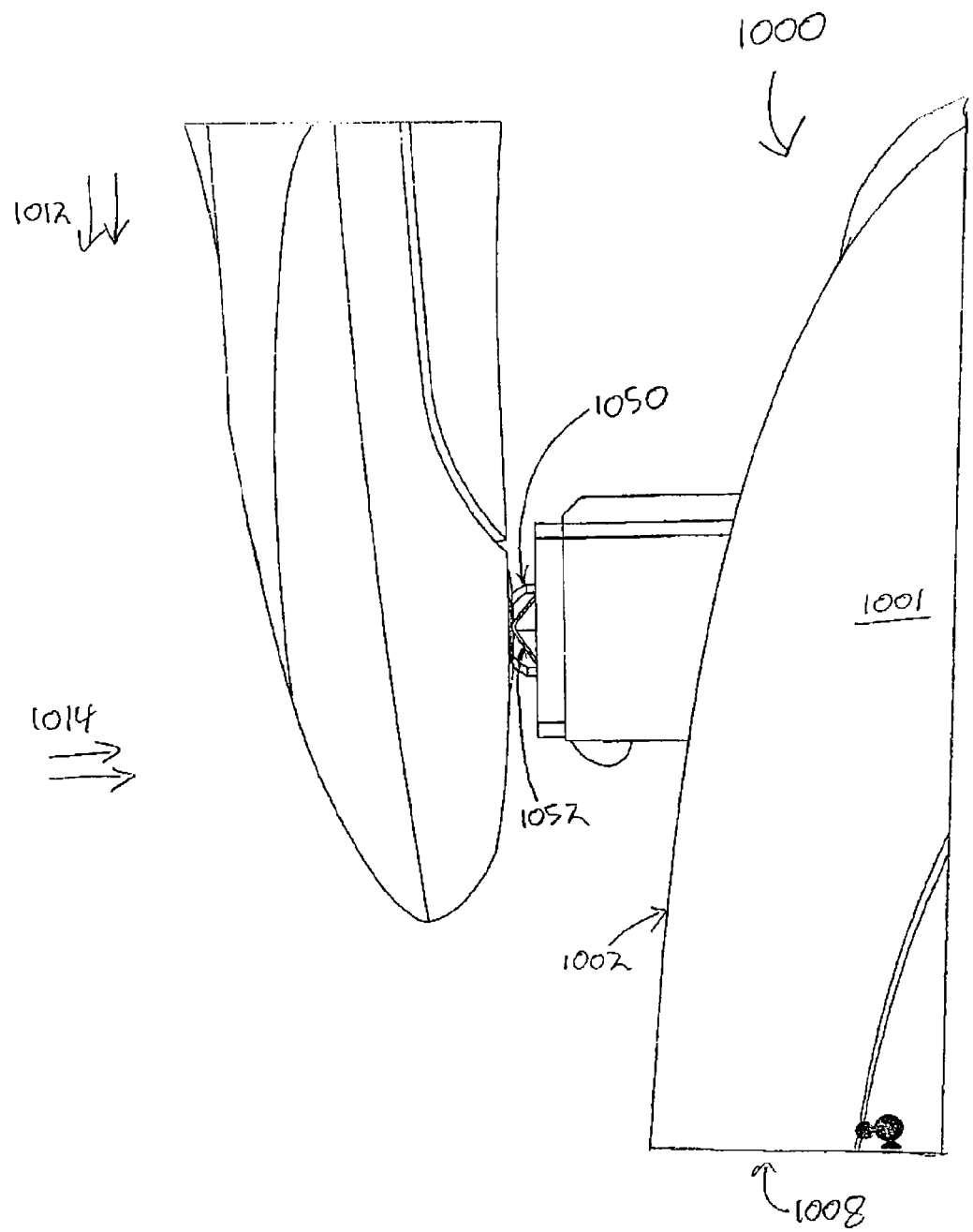
FIGS. 10A and 10B are illustrations of a headset base with the charging contact.
Figure 10B:
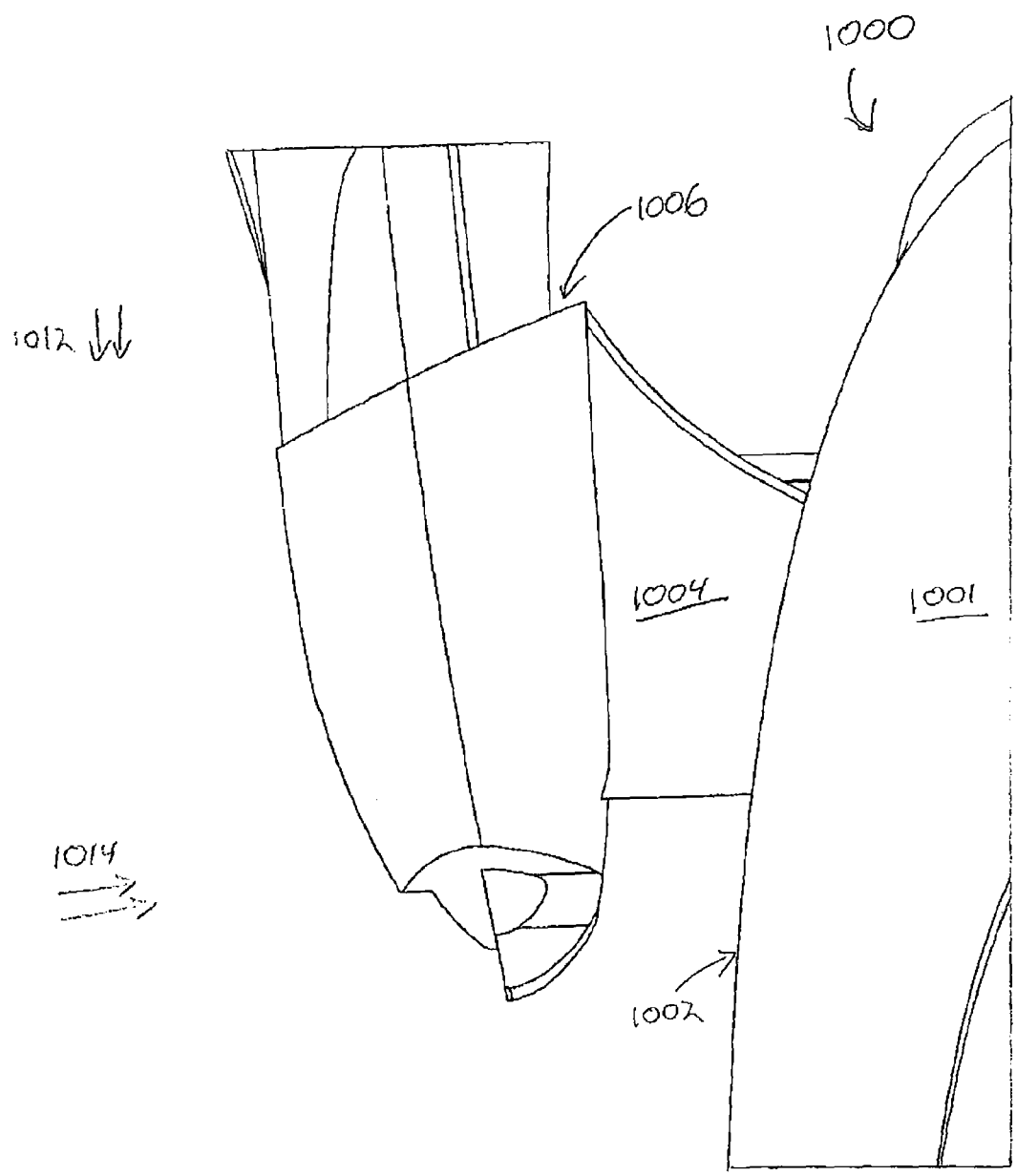

Referring to FIGS. 10A and 10B, an embodiment of a headset charging base of the present invention is illustrated. Although a charging base for use with a portable headset device is illustrated, the charging base may be utilized with any battery powered communication device that requires battery power during portable operation. The headset charging base 1000 includes a main body 1001 with a front wall portion 1002, main body underside portion 1008, and a charging contact device. The charging contact device includes a non-conductive actuator 1050 and conductive contacts 1052 which function as described above. Conductive contacts 1052 comprise two independent contacts as described above. Referring to FIG. 10B, headset charging base 1000 also includes headset cradle 1004 having a cradle well 1006 not shown in FIG. 10A. Main body 1001 is preferably made of a lightweight organic polymer, but can consist of any suitable material. Main body underside portion 1008 provides support and a non-scratching material for the base of the charger.

Headset charging base 1000 enables easy insertion of the headset into the charging base and easy coupling of the headset charging contacts to the base station charging contacts without contact between the base station charging contacts and headset housing located near the headset charging contacts. In particular, the charging contact device includes actuator 1050 disposed between the independent contacts of conductive contacts 1052. Because actuator 1050 retracts conductive contacts 1052 during insertion of the headset into cradle 1004, conductive contacts 1052 do not contact the headset at any location other than the headset charging contacts during detent.

As will be described in further detail, the novel operation of headset charging base 1000 enables a headset to be inserted into charging base 1000 while protecting the headset housing from the charging base conductive contacts 1052. Furthermore, the structure of charging base 1000 allows the headset to be inserted into the charging base 1000 such that the headset is properly guided to its proper location to achieve a detent between the headset and charging base 1000, enabling secure contact between the contacts of the headset and the corresponding contacts of the charging base when the headset is inserted into the cradle. The charging base 1000 includes a headset cradle 1004 mated to front wall portion 1002 for guiding and aligning the inserted headset. The headset cradle 1004 is shaped to substantially match the shape of a headset, and is aligned with the charging contact device 1010 such that when inserted into headset cradle 1004, the headset contacts are aligned with conductive contacts 1052 of charging contact device 1010. In an embodiment of the invention, front wall portion 1002 and headset cradle 1004 are inclined at approximately 5 to 10 degrees from vertical allowing for convenient insertion of the headset, although other angles or no angle may be utilized.

The headset is inserted into headset charging base 1000 utilizing a downward motion 1012 in combination with a forward motion 1014 towards the face of front wall portion 1002. Conductive contacts 1052 provide charging current to corresponding charging contacts of the headset. In an alternate embodiment of the invention, charging contact device 1010 is mounted with headset cradle 1004. In a further alternative embodiment, headset cradle 1004 is a recessed area in main body 1001 extending into front wall portion 1002 and substantially shaped to match an inserted headset.

The charging base 1000 may further include components typical of battery charging devices, such as circuitry or processors for controlling the supply of charging current to an inserted device based on the battery status, connectors for connection to a cord that is connected to a main ac power supply of the type utilized with a common wall outlet, an ac/dc power converter which converts an external power supply to a standard DC voltage which is usable by the charging base for charging a battery therein, and indicators for identifying the charging status of the headset battery. Charging circuitry and associated components may be mounted on a printed circuit board (PCB) disposed within the charging base 1000.

In operation, the headset is inserted into headset charging base 1000 utilizing a downward motion 1012 in combination with a forward motion 1014 towards the face of front wall portion 1002. As the headset makes contacts with charging contact device 1050, the actuator 1050 retracts conductive contacts 1052 during insertion of the headset into cradle 1004. Actuator 1050 retracts conductive contacts 1052 away from the headset as the headset slides into the cradle, thereby eliminating contact between conductive contacts 1052 with the headset housing during insertion. When the headset contacts are properly aligned with conductive contacts 1052, actuator 1050 extends conductive contacts 1052 to form contact with the headset contacts. By minimizing friction between conductive contacts 1052 and the headset housing during docking or undocking, the headset housing is protected from damage and wear.

Although reference is made throughout the specification to a headset base and headset, the present invention could be employed in any device having contacts which couple with contacts of a removable device. Although reference is made throughout the specification to utilizing the contacts for charging, other purposes such as the transfer of data or any other purpose requiring coupling of devices. Furthermore, although in the preferred embodiment the charging contact apparatus with actuator is located at the charging base, in other embodiments the charging contact apparatus with actuator may be located at the headset or other location.

Figure 1:
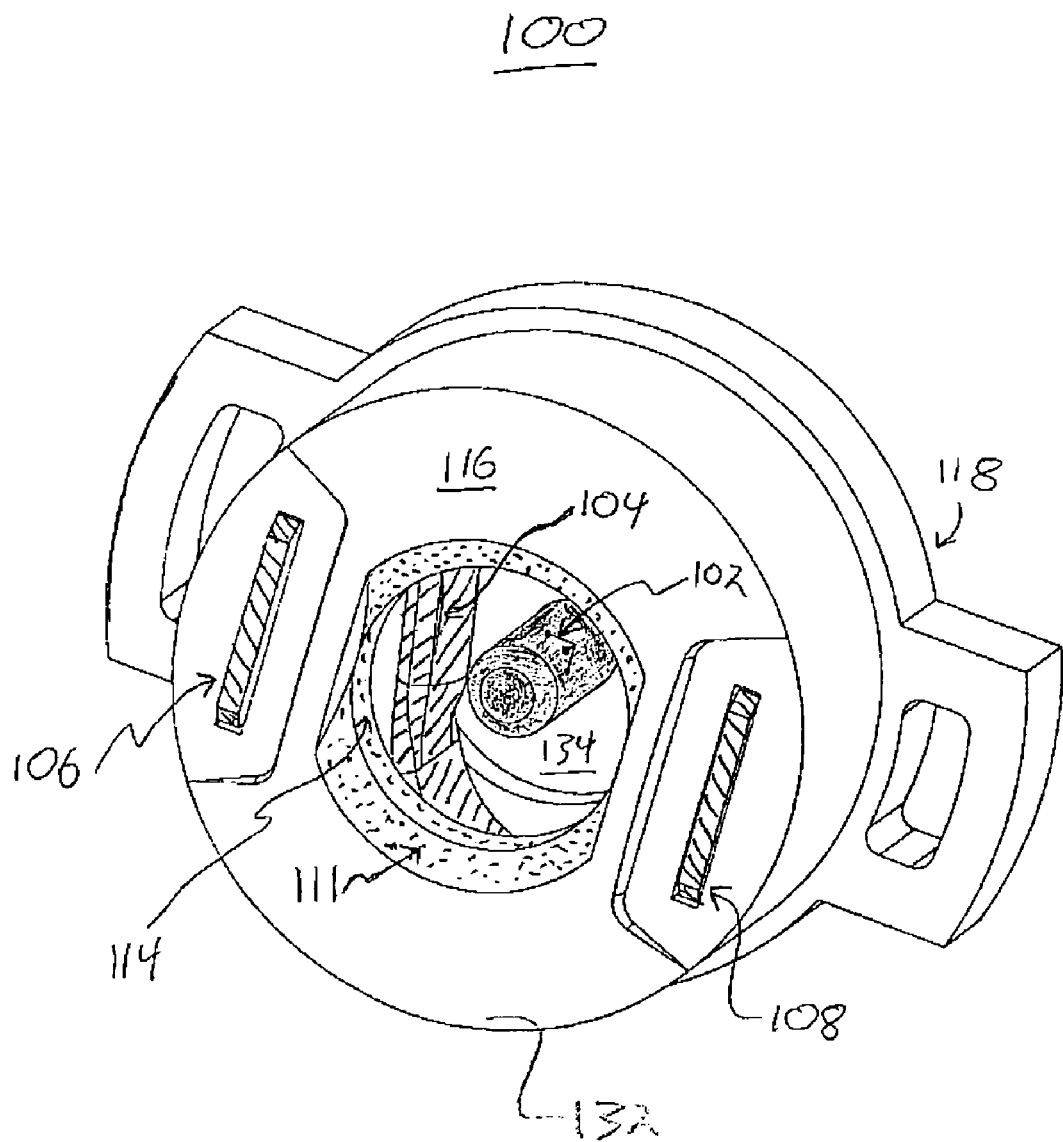
FIG. 1 is an illustration of an embodiment of a charging interface module.

In an embodiment of the invention, the base charging contact apparatus 600 is utilized with dual system charging interface 100 illustrated in FIG. 1. The dual system charging interface 100 enables charging of a battery at the headset using either a first charging system or a second charging interface depending on a headset user's selection. The dual system charging interface includes both a female plug connector for mating with a cable having a male charging plug, as well as parallel charging contacts located on the front surface of the headset for use with a charging base unit.

In particular, the dual system charging interface provides for an aperture in a front surface of the headset that that may be utilized by either charging interface. Interior charging contacts for the female plug connector are disposed within a well in the dual system charging interface and accessed via the aperture in the front surface. Furthermore, the aperture may be specially designed to receive an actuator located at the charging base mechanism to detent the parallel charging contacts with corresponding charging contacts at the charging base unit.

Referring to FIG. 1, a front view illustration of an embodiment of the dual system charging interface module for use with a headset is shown. The dual system charging interface is shown removed from a headset. In use, the front surface of the dual charging interface is exposed on the headset surface.

The dual system charging interface module 100 (also referred to herein as "dual system charging interface") comprises an outer housing 132 having a front surface 116 and a back surface 118. Outer housing 132 is made of a molded polymer, although any suitable material may be used. Front surface 116 contains an aperture 114 opening to a well 134 located within outer housing 132 for accepting a male plug. Front surface 116 further contains a semi-spherical recessed area 111. Two surface charging contacts, negative contact arc 106 and positive contact arc 108 are disposed on front surface 116. The dual system charging interface 100 further comprises a negative contact 104 and a positive contact 102 disposed within well 134. Although referred to with different designations herein, in an embodiment of the invention, negative contact 104 and negative contact arc 106 are a single piece construction and electrically parallel. Similarly, positive contact 102 and positive contact 108 are a single piece construction and electrically parallel. The negative contact and the positive contact are made of a suitable electrically conductive material such as copper.

The dual system charging interface module 100 is mounted from inside the headset housing and presents an approximately 6.5 mm diameter plastic face with slightly raised metal negative contact arc 106 and positive contact arc 108 arrayed around aperture 114. For appearance purposes, the module is mounted so that the face is as flush as possible to the surface of the headset housing. The contact arcs are proud of the surface by about 0.1 to 0.2 mm in an embodiment of the invention. In an embodiment of the invention, the contact arcs are concentric shaped. In a further embodiment of the invention, the contact arcs are linear.

The dual system charging interface 100 includes two charging interfaces. The first charging interface utilizes stationary charging contacts comprising negative contact arc 106 and positive contact arc 108 disposed on front surface 116. Negative contact arc 106 and positive contact arc 108 mate with corresponding contacts on a charging base when a headset is inserted into the charging base. The corresponding contacts on the charging base are typically spring loaded, and engage negative contact arc 106 and positive contact arc 108 when the headset is inserted into the charging base. Negative contact arc 106 is coupled to electrical ground. Recessed area 111 and aperture 114 are utilized to secure contact between negative contact arc 106 and positive contact arc 108 with corresponding charging contacts on a charging base.

Figure 3:
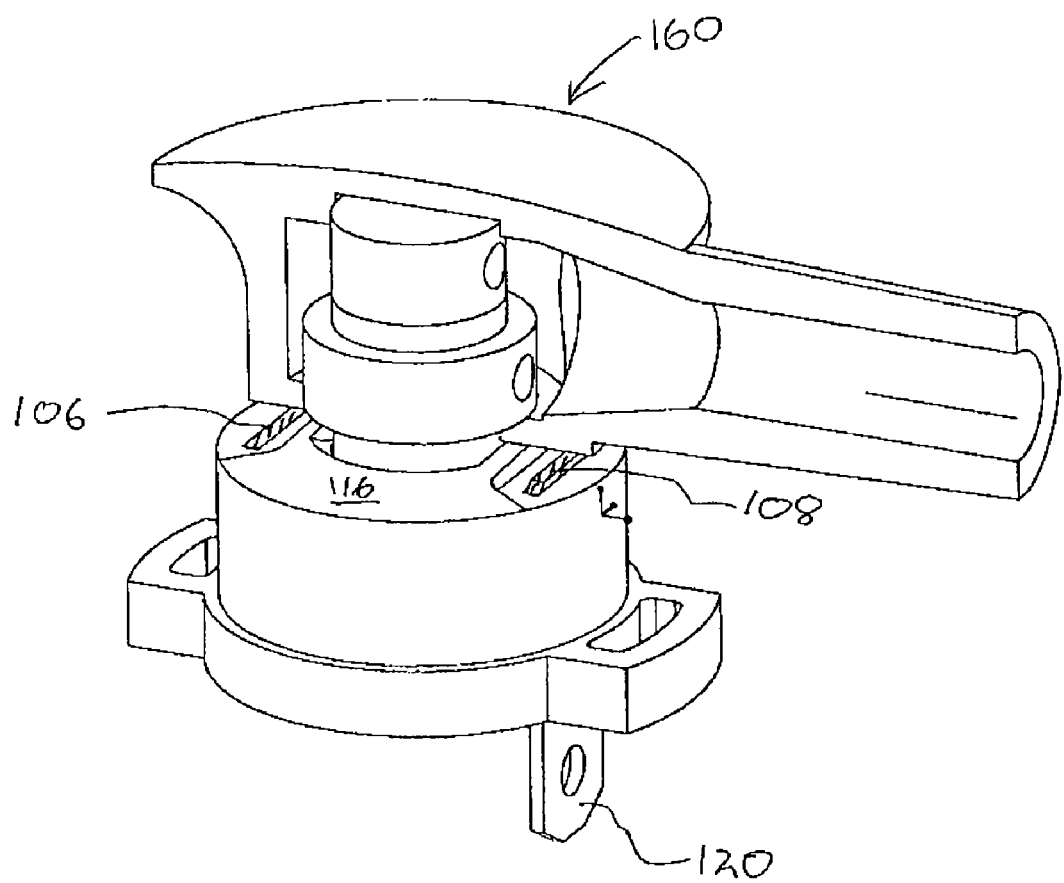
FIG. 3 is an illustration of a cable with a male plug connector coupled with the charging interface module.

The second charging interface comprises a negative contact 104 and positive contact 102 disposed within well 134 behind aperture 114. The second charging interface operates as a female connector for use with a cable having a male charging plug. In an embodiment of the invention, negative contact 104 is a spiral coil contact positioned within well 134 that engages the inserted cable having a male charging plug. Positive contact 102 is a pin structure disposed in the center of well 134 that inserts into a corresponding positive contact receptacle of the male charging plug. Positive contact 102 and negative contact 104 mate with a male the male charging plug of cable 160 shown in FIG. 3. A cutaway view of cable 160 with its corresponding boot is shown in FIG. 3.

Figure 2:
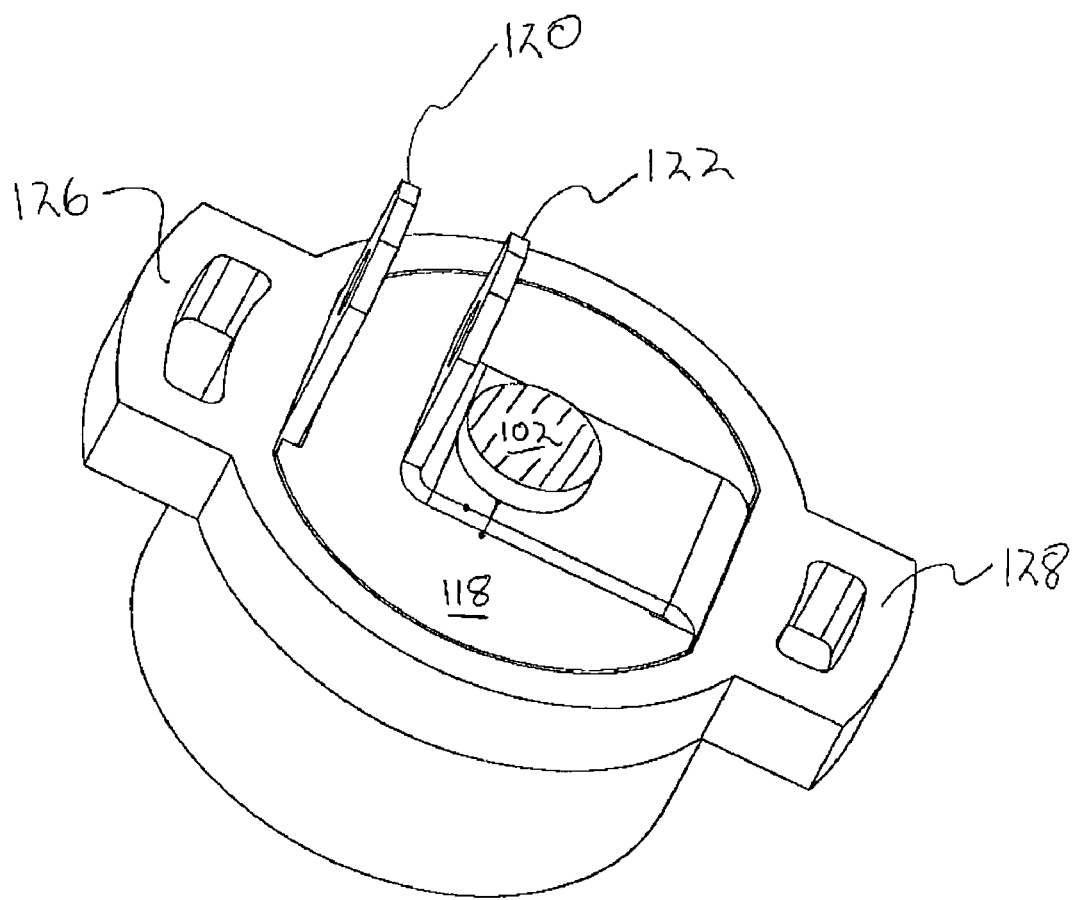
FIG. 2 is an illustration of the backside of the interface shown in FIG. 1.
Figure 4:
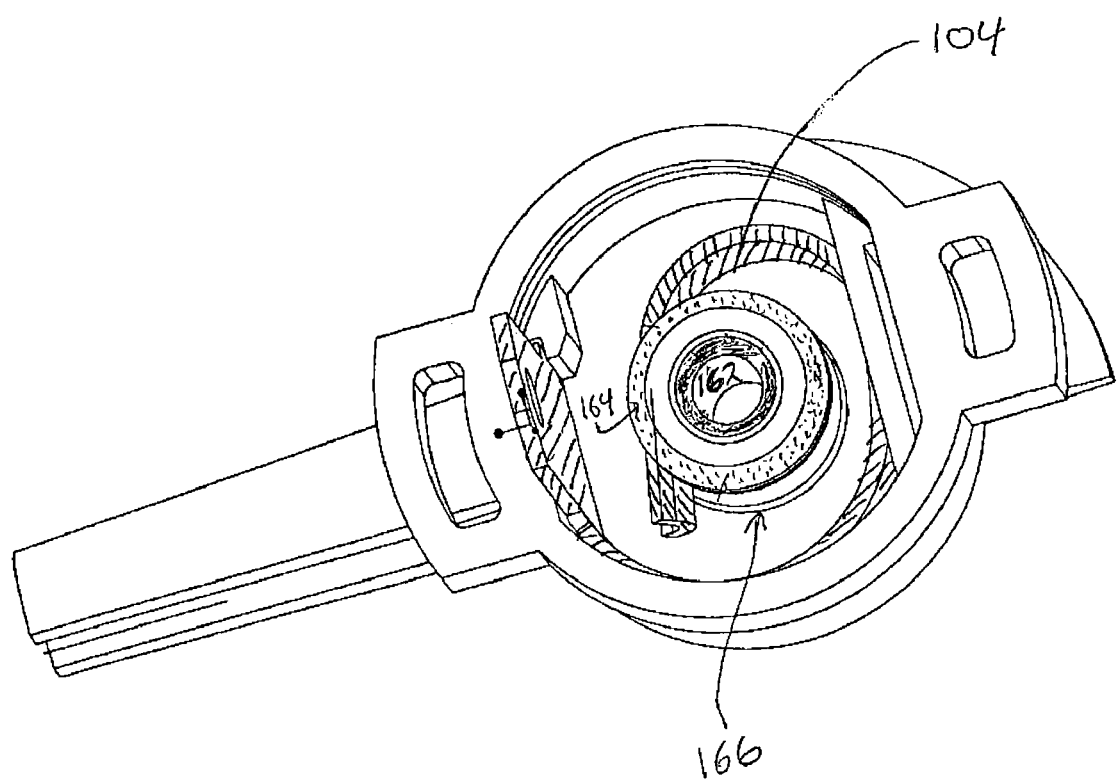
FIG. 4 illustrates a backside internal view of the charging interface module coupled with a male plug.

Referring to FIG. 2 showing the backside of dual system interface 100, the bottom surface 122 of positive contact 102 is shown. Referring to FIG. 4, illustrated is a cable with a cylindrical male plug 166 with interior positive contact 162 and exterior negative contact 164. Interior positive contact 162 itself has a female connector. Interior positive contact 162 has a female connector constructed to receive and mate with positive contact 102 of dual system charging interface 100. For clarity, positive contact 102 is not shown in FIG. 4. Exterior negative contact 164 has a flanged outer surface constructed to couple with negative contact 104 of dual system charging interface 100.

In operation, the cylindrical male plug 166 is inserted through aperture 114 into well 134. Positive contact 102 of dual system charging interface 100 fits into the female connector of interior positive contact 162 to form an electrical interconnection. During insertion of male plug 166, negative contact 104 of dual system charging interface 100 extends in an outward radial direction due to force from exterior negative contact 164. Negative contact 104 then retracts into the flanged outer surface of negative contact 164 as male plug 166 is further inserted into well 134 to a detent position. Referring to FIG. 4, negative contact 104 of dual system charging interface 100 is shown mated in a detent position with exterior negative contact 164 of cable 160 after insertion of cable 160 into well 134.

Male cable 160 delivers a charging current for delivery to the headset battery via positive charging contact 102. Negative terminal 120 is coupled to electrical ground. Thus, dual system charging interface 100 utilizes aperture 114 in both the first charging interface and the second charging interface. By utilizing the aperture 114 in both charging interfaces, the area required by the dual system charging interface is minimized.

Referring to FIG. 2, the backside of outer housing 132 is shown. Outer housing 132 includes a back surface 118. A negative terminal 120 and positive terminal 122 are utilized to provide charging current to a rechargeable battery located at the headset. In an embodiment of the invention, negative contact 104, negative contact arc 106, and negative terminal 120 are a single piece construction. Similarly, positive contact 102, positive contact arc 108, and positive terminal 122 are a single piece construction. The battery is a rechargeable battery, such as a lithium-ion battery, which is electrically coupled to negative terminal 120 and positive terminal 122. The electrically parallel first charging interface and second charging interface provide an efficient and space saving arrangement to provide charging power to the rechargeable battery. In an alternate embodiment, although electrically coupled, negative contact 104, negative contact arc 106, and negative terminal 120 are not a single piece construction. Similarly, in an alternate embodiment, positive contact 102, positive contact arc 108, and positive terminal 122 are not a single piece construction. Positive contact 102 extends through positive terminal 122 and back surface 118 into well 134.

As a result, charging current is provided to a battery at the headset coupled to negative terminal 120 and positive terminal 122 regardless of which charging interface is utilized. Outer housing 132 further includes headset mounting handles 126 and 128 for mounting dual system charging interface 100 within a headset. The dual system charging interface module 100 may be manufactured as a stand-alone module, and has the packaging flexibility allowing for either board or cable mounting.

Figure 5:
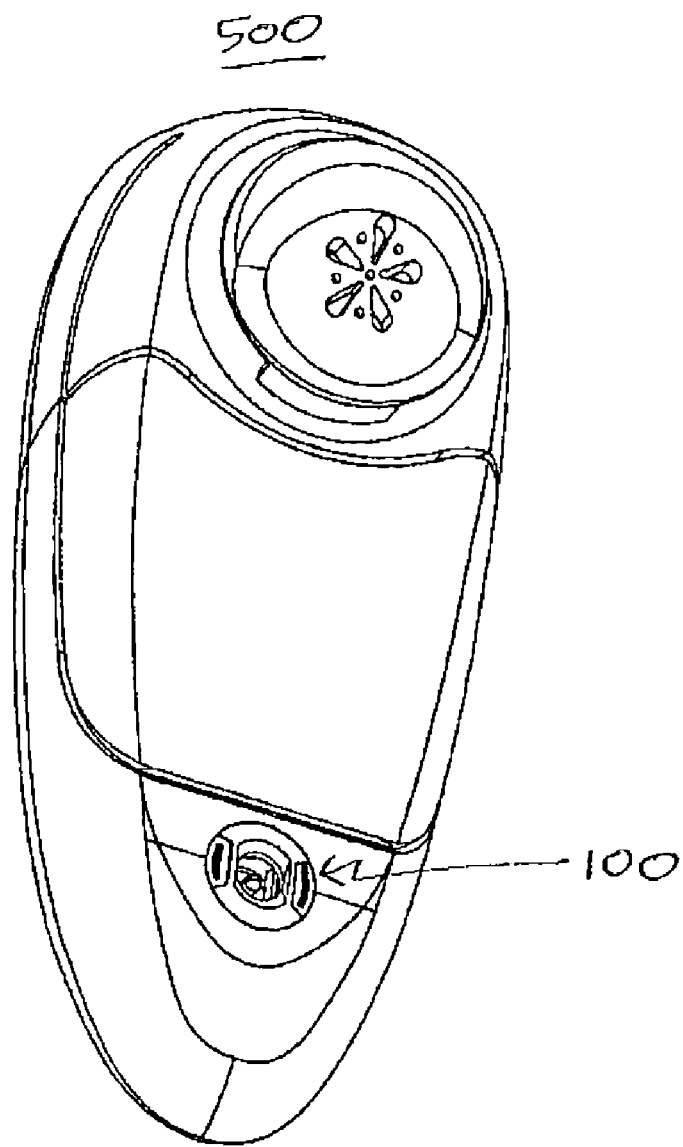
FIG. 5 illustrates a headset with the charging interface module.

Thus, the dual system charging interface 100 includes at least two sets of charging contacts. Referring to FIG. 5, a headset 500 incorporating dual system charging interface 100 is illustrated. Each set of charging contacts can be used independently from the other set to transfer charging current. When headset 500 is coupled to a charger, one of the sets of charging contacts electrically couple to contacts of the charger, and charging current is supplied from the charger to the battery at the headset to recharge the battery. Dual contact systems disposed on a single headset are beneficial in that they allow a user a choice of charging systems depending on the user's location. For example a cable adaptable for use with a cigarette lighter may be used in an automobile environment, while a charging base may be preferred at the user's office location.

Furthermore, the dual system charging interface is designed for use with common preexisting systems for providing charging power such as spring loaded contact mechanisms while also providing for use with charging power systems with advanced mechanisms to protect the headset surface during coupling of the headset and charger. Thus, a headset contact system can be implemented in the headset that can accommodate different charger system configurations in a space saving, compact, mass produced, and low cost headset. In summary, the dual system contact interface described herein offers several advantages. The dual system charging interface 100 provides a solution that is small, adaptable to both stationary and mobile environments, and flexible in its mounting and orientation for optimal positioning on future headsets. By utilizing dual system charging interface 100 as a standardized interface, manufacturers can reduce the design time on future devices and make future headsets backwards compatible with previous chargers.

The operation of the dual system charging interface 100 will now be described. Although they make be of a single piece construction, each set of charging contacts are intended to be used independently from each other, depending on user choice. Utilizing negative contact 104 and positive contact 102 of the second charging interface system, a male plug is inserted into well 134 through aperture 114. In the described embodiment of the invention, the male plug 166 is a coaxial plug attached to a cable 160 with an interior positive contact 162 and exterior negative contact 164. Cable 160 is electrically connected to a power source which can allow charging while in-use. Potential power sources include, for example, a wall transformer or a cigarette lighter adapter during automobile use. As the male plug 166 is inserted into well 134, exterior negative contact 164 exerts a force on negative contact 104, resulting in negative contact 104 extending in an outward radial direction. Simultaneously, positive contact 102 enters interior positive contact 162.

As the insertion process of male plug 166 continues, the force on negative contact 104 by exterior negative contact 104 recedes as the flanged outer surface of negative contact 164 becomes parallel with negative contact 104, resulting in negative contact 104 retracting into a groove in the outer surface of negative contact 164 in a detent position. Simultaneously, positive contact 102 continues to be inserted into interior positive contact 162 until full insertion is reached, corresponding to the detent position of negative contact 164. The detent position of mated negative contact 104 and exterior negative contact 164 is illustrated in FIG. 4. The radial force applied by negative contact 104 against male plug 166 results in sideways movement of male plug 166 until positive contact 162 engages positive contact 102 and maintains contact.

Utilizing negative contact arc 106, positive contact arc 108, and recessed area 111 of the first charging interface system, a headset implementing dual system charging interface 100 is inserted into a charging base with a charger contact 600 shown in FIGS. 6 and 7. During docking the actuator outer member 610 contacts the headset, which presses the actuator outer member 610 (and therefore the actuator 608) in the inward retraction direction. Side wings 621 and 622 are coupled to spring contacts 622 and 624, and compress the spring contacts 622 and 624 in the inward retraction direction. The spring contacts are thus lifted away from contact with the headset during docking of the headset. When the spring contact 622 and spring contact 624 are correctly aligned with negative contact arc 106 and positive contact arc 108 located on the headset, the actuator outer member 610 extends toward the headset into recessed area 111 allowing the spring contact apparatus with spring contact 622 and spring contact 624 to decompress and contact negative contact arc 106 and positive contact arc 108 on the headset in a detent position in response to movement of the actuator.

Having described the invention in terms of a preferred embodiment, it will be recognized by those skilled in the art that various types of components may be substituted for the configuration described above to achieve an equivalent result. It will be apparent to those skilled in the art that modifications and variations of the described embodiments are possible, and that other elements or methods may be used to perform equivalent functions, all of which fall within the true spirit and scope of the invention as measured by the following claims.

The invention claimed is:

1. An apparatus for a conductive contact comprising:
a housing having a hollow core with a longitudinal axis;
a dielectric actuator for initiating contact with a portable device, wherein the dielectric actuator is disposed in part within the hollow core and capable of movement within the core along the axis; and
a spring contact coupled to the dielectric actuator, wherein the spring contact is capable of compression and decompression along the longitudinal axis based on movement of the dielectric actuator.

2. The apparatus of claim 1, wherein the actuator extends beyond the spring contact along the longitudinal axis, and wherein during coupling or decoupling of the spring contact with corresponding contacts on the portable device the actuator moves in a first direction along the longitudinal axis, and wherein the actuator compresses the spring contact along the longitudinal axis in the first direction.

3. The apparatus of claim 2, wherein during compression of the spring contact in the first direction, the spring contact is lifted away from the portable device to eliminate undesired physical contact with the portable device.

4. The apparatus of claim 2, wherein the portable device is a headset.

5. The apparatus of claim 1, wherein the actuator moves in a decompression direction so that the spring contact decompresses in response to the actuator to a detent position coupled with corresponding contacts on a portable device.

6. The apparatus of claim 5, wherein the actuator acts as a detent for the mated spring contact and portable device conductive contacts.

7. The apparatus of claim 1, wherein the spring contact provides charging current to recharge a portable device battery.

8. The apparatus of claim 1, wherein the actuator comprises an outer member with a surface that engages and applies force to the spring contact to compress the spring contact in response to movement of the actuator.

9. A headset charging base comprising:
a body, wherein the body comprises a cradle having a cradle well for receiving a headset;
a charging base conductive contact apparatus coupled to the body, wherein the charging base conductive contact apparatus comprises:
a hollow inner cylindrical core with a longitudinal axis;
a dielectric actuator for initiating contact with the headset, wherein the dielectric actuator is capable of movement within the cylindrical core along the axis; and
a spring contact disposed in part within the hollow inner cylindrical core and coupled to the dielectric actuator, wherein the spring contact is capable of compression and decompression along the longitudinal axis based on movement of the dielectric actuator,
wherein the headset is properly guided by the cradle when the headset is inserted into the cradle such that conductive contacts disposed on the headset are aligned with the spring contact of the charging base conductive contact apparatus.

10. The charging base of claim 9, wherein the cradle is shaped to substantially match the shape of the headset.

11. The charging base of claim 9, wherein the cradle is a recess disposed in the body.

12. The charging base of claim 9, wherein the actuator extends beyond the spring contact along the longitudinal axis, and wherein during coupling or decoupling of the spring contact with corresponding contacts on the headset, the actuator moves in a first direction along the longitudinal axis, and wherein the actuator compresses the spring contact along the longitudinal axis in the first direction.

13. The charging base of claim 12, wherein during compression of the spring contact in the first direction, the spring contact is lifted away from the portable device to eliminate undesired physical contact with the headset.

14. The charging base of claim 9, wherein the actuator moves in a decompression direction so that the spring contact decompresses in response to the actuator to a detent position coupled with corresponding headset contacts.

15. The charging base of claim 14, wherein the actuator acts as a detent for the mated spring contact and headset contacts.

16. The charging base of claim 9, wherein the spring contact provides charging current to recharge a portable device battery at the headset.

17. The charging base of claim 9, wherein the actuator comprises an outer member with a surface that engages and applies force to the spring contact to compress the spring in response to movement of the actuator.

18. A method for coupling base station charging contacts located at a headset charging base to headset charging contacts disposed on a headset body, the method comprising:
- providing an actuator at the base station charging contact;
  - contacting the headset body with the actuator during coupling, wherein the actuator lifts the base station charging contacts in a direction away from the headset body during coupling such that friction between the base charging contacts and the headset body is reduced;
  - releasing the base station charging contacts in a direction towards the headset body to mate the base station charging contacts with the headset charging contacts when the headset charging contacts are properly positioned.

19. The method of claim 18, wherein the actuator extends towards the headset body when the headset charging contacts are properly positioned, resulting in the releasing of the base station charging contacts to mate with the headset charging contacts.

20. A charging interface system between a charging base and a wireless headset comprising:
- a wireless headset charging interface disposed at a headset comprising
  - a housing with a front surface, wherein the front surface includes a recessed area; and
  - conductive contacts disposed on the front surface outside the recessed area,
- wherein the conductive contacts comprise a positive contact and a negative contact; and
- a charging base interface disposed at a charging base comprising
  - a hollow inner core with a longitudinal axis;
  - a dielectric actuator disposed within the hollow inner core capable of movement within the inner core along the axis; and
  - a spring contact coupled to the dielectric actuator, wherein the spring contact is capable of compression and decompression along the longitudinal axis responsive to movement of the actuator, and wherein the dielectric actuator compresses upon first contact with the headset charging interface and subsequently extends into the recessed area when the charging base interface is coupled to the wireless headset charging interface.

21. The charging interface system of claim 20, wherein the recessed area is semi-spherical and the actuator includes a semi-spherical end such that the actuator inserts into the semi-spherical recessed surface.

* * * * *